(12) United States Patent
Hrehor, Jr. et al.

(10) Patent No.: US 11,513,600 B1
(45) Date of Patent: Nov. 29, 2022

(54) INFORMATION HANDLING SYSTEM GLASS KEYBOARD WITH DEFLECTION AND HAPTIC FEEDBACK

(71) Applicant: Dell Products L.P., Round Rock, TX (US)

(72) Inventors: Robert D. Hrehor, Jr., Round Rock, TX (US); Jace W. Files, Round Rock, TX (US); John Trevor Morrison, Round Rock, TX (US)

(73) Assignee: Dell Products, L.P., Round Rock, TX (US)

( * ) Notice: Subject to any disclaimer, the term of this patent is extended or adjusted under 35 U.S.C. 154(b) by 0 days.

(21) Appl. No.: 17/493,236

(22) Filed: Oct. 4, 2021

(51) Int. Cl.
*G06F 3/041* (2006.01)
*G06F 3/01* (2006.01)
*G06F 3/02* (2006.01)

(52) U.S. Cl.
CPC ............ *G06F 3/016* (2013.01); *G06F 3/0202* (2013.01)

(58) Field of Classification Search
None
See application file for complete search history.

(56) References Cited

U.S. PATENT DOCUMENTS

| 10,409,391 B2 | 9/2019 | Silvanto et al. |
| 2013/0050095 A1* | 2/2013 | Nakajima ............. G06F 3/0202 345/168 |
| 2014/0066285 A1* | 3/2014 | Beall .................... C03C 21/002 501/32 |
| 2014/0340208 A1* | 11/2014 | Tan ........................ G06F 3/016 340/407.2 |
| 2018/0074694 A1 | 3/2018 | Lehmann |
| 2018/0217669 A1 | 8/2018 | Ligtenbert et al. |
| 2020/0192484 A1 | 6/2020 | Lehmann et al. |

* cited by examiner

*Primary Examiner* — Carl Adams
(74) *Attorney, Agent, or Firm* — Zagorin Cave LLP; Robert W. Holland

(57) ABSTRACT

A portable information handling system integrates a keyboard having plural sensors configured at each of keyboard key positions to detect key inputs made with presses at the key positions by deflection of a glass cover having a reduced thickness at each key position. Haptic devices, such as piezo actuators, actuate at sensor sensed inputs to reinforce end user input touch feedback over the feedback provided by deflection of the glass cover. In one embodiment, the plural sensors are incorporated in a membrane having OLED illumination that identifies the key value at each key position.

19 Claims, 5 Drawing Sheets

INFORMATION HANDLING SYSTEM GLASS KEYBOARD WITH DEFLECTION AND HAPTIC FEEDBACK

BACKGROUND OF THE INVENTION

Field of the Invention

The present invention relates in general to the field of portable information handling systems, and more particularly to an information handling system glass keyboard with deflection and haptic feedback.

Description Of The Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Portable information handling systems integrate processing components, a display and a power source in a portable housing to support mobile operations. Portable information handling systems allow end users to carry a system between meetings, during travel, and between home and office locations so that an end user has access to processing capabilities while mobile. Tablet configurations typically expose a touchscreen display on a planar housing that both outputs information as visual images and accepts inputs as touches. Convertible configurations typically include multiple separate housing portions that couple to each other so that the system converts between closed and open positions. For example, a main housing portion integrates processing components and a keyboard and rotationally couples with hinges to a lid housing portion that integrates a display. In a clamshell configuration, the lid housing portion rotates approximately ninety degrees to a raised position above the main housing portion so that an end user can type inputs while viewing the display. After usage, convertible information handling systems rotate the lid housing portion over the main housing portion to protect the keyboard and display, thus reducing the system footprint for improved storage and mobility.

One goal with portable information handling systems is to provide as much processing capability as possible in a light weight and thin housing. A difficulty in achieving a thin housing is that an integrated keyboard typically adds thickness due to key travel. Some low profile portable information handling systems use keyboards with a reduced key travel distance to help reduce the housing thickness. Other low profile portable information handling systems use touch-type keyboards with keys that have no travel, instead using touch sensors to detect inputs. Typically end users have difficulty making inputs at such low profile keyboards because the low or zero key travel fails to give the end user feedback of when an input was sensed. Without feedback from physical key travel, the end user generally has to see the input appear on the display to be sure that the press at the key was sensed. One alternative to help provide feedback of an input is to introduce a haptic feedback at detection of a sensed input, such as a vibration introduced by rotation of an off-balance weight or piezo actuator. The end user detects the vibration as an indication to release the key and can thus type inputs in a more rapid manner. A difficulty with this approach is that the vibration tends to have a larger feel than is associated with a single key, which can confuse the end user regarding completion of the sensed input.

SUMMARY OF THE INVENTION

Therefore, a need has arisen for a system and method which accepts keyed inputs at a keyboard through a deflection of a glass cover.

In accordance with the present invention, a system and method are provided which substantially reduce the disadvantages and problems associated with previous methods and systems for accepting inputs at a keyboard. Keyboard key sensors disposed under a contiguous material cover, such as a sheet of glass ceramic, detect key inputs when a press at a key position deflects the contiguous material cover to contact a sensor, such as at an area of reduced thickness located at each key position. Actuation of a haptic device, such as a piezo actuator, at an input sensed by deflection of the area of reduced thickness provides feedback of the input to an end user to reinforce the feedback provided by the deflection.

More specifically, a portable information handling system processes information with a processor and memory disposed in a portable housing that cooperate to execute instructions and present the information as visual images at a display. A keyboard integrates in the housing with plural sensors disposed in key positions of a keyboard configuration and covered by a contiguous material of glass ceramic having an area of reduced thickness at the key positions. A press at a key position deflects the glass ceramic at the reduced thickness to contact the sensor and indicate a key input. A piezo actuator at each key position provides a haptic feedback of a key press with actuation at an input detected by the sensor at the key position. A membrane incorporates the plural sensors and, in one embodiment, the piezo actuators, and can also include an OLED material that illuminates the key positions, such as with a value of the key at each key position.

The present invention provides a number of important technical advantages. One example of an important technical advantage is that a portable information handling system incorporates a keyboard with a low profile to support a thin housing configuration. The keyboard senses inputs based upon a deflection of a glass cover at areas of reduced thickness so that an end user has feedback of the input made. Piezo actuators disposed at each sensor reinforce the input feedback by actuating at the sensed input. A membrane having OLED material illuminates to indicate a key position and can incorporate the plural sensors and haptic devices. In one embodiment, the glass cover is a glass ceramic, such as GORILLA GLASS, that endures repeated deflection with minimal wear to provide a robust, thin, light weight keyboard having a reduced cost.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

A portable information handling system keyboard senses keyed inputs by deflection of a glass cover over sensors configured at key positions and reinforces feedback of the keyed inputs with a haptic actuation of a piezo actuator at each key position. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
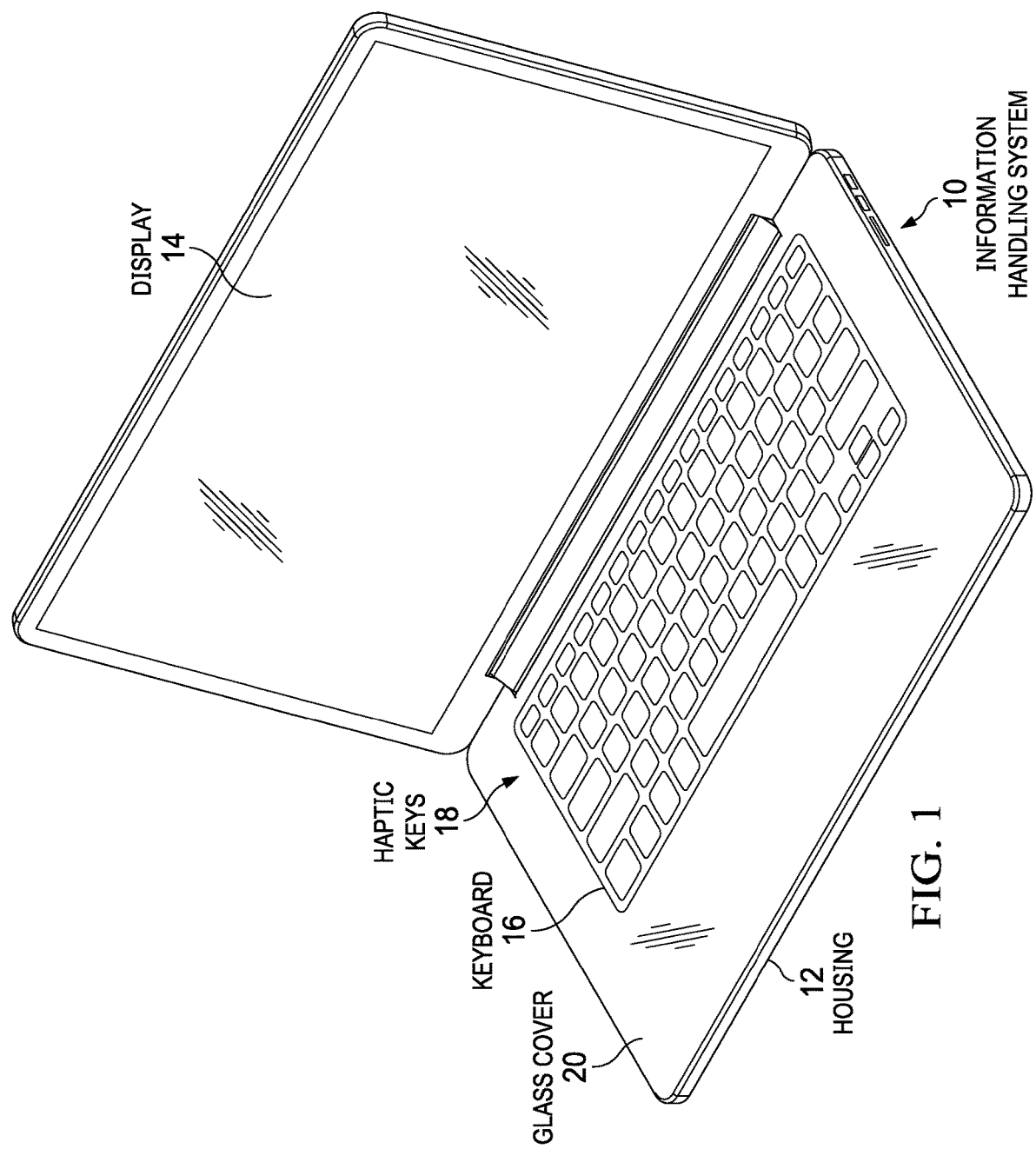
FIG. 1 depicts a front perspective view of a portable information handling system having a keyboard with a glass cover.

Referring now to FIG. 1, a front perspective view depicts a portable information handling system 10 having a keyboard 16 integrated with a glass cover 20. The example embodiment has a portable housing 12 with a convertible configuration of a lid housing portion that integrates a display 14 and a main housing portion that integrates keyboard 16. Haptic keys 18 have a keyboard configuration, such as a QWERTY configuration, that an end user interacts with to type inputs to a processor disposed in housing 12. Glass cover 20 provides a contiguous solid material across the upper surface of the main portion of housing 12 and accepts inputs at a press of haptic keys 18 that deflect over a key sensor as described in greater depth below. Although the example embodiment has one solid piece of glass extending across the entire main housing portion, alternative embodiments may have a glass cover 20 that is sized to fit over the perimeter of keyboard 16 and within an opening at the upper surface of housing 12. In one example embodiment, glass cover 20 is a glass ceramic material, such as GORILLA GLASS. In alternative embodiments, other types of materials may be used, such as plastics. Transparent material for glass cover 20 allows presentation of the key values through the cover instead of with etching or marking exposed at the outer surface, however, an opaque material may be used with markings at the external surface of glass cover 20 that show the key positions.

In the example embodiment, a thin piece of formed glass is disposed as the cover glass 20 across the entire keyboard region with a thinner glass covering each key position. For example, a contiguous piece of 0.3 mm thick GORILLA GLASS has some thickness machined down at key positions so that the glass material deflects when pressed at a key position. In one embodiment, the glass at a key position may be machined to provide a desired optical effect, such as enlarging key value indications written or presented below glass cover 20 or to refract light from the key values towards the front of housing 12 so that the key values are more readily seen by an end user typing at keyboard 16. In an alternative embodiment cover glass 20 may have a uniform thickness that provides sufficient deflection at the key positions to accept and input at an underlying sensor. When a haptic key 18 is pressed, cover glass 20 deflects slightly to actuate a keyboard membrane switch sensor beneath the key, which reports the input to the keyboard controller. At activation of the membrane switch sensor, a haptic response is triggered that couples directly to the haptic key 18 that was pressed, thereby providing reinforcing feedback to the end user of a successful input. As is detailed below, a hyperelastic lattice material separating the keyboard glass from the keyboard membrane helps to isolate the rest of the glass from the haptic response so that the end user haptic feedback is isolated to the key that sensed the input. Although the example embodiment depicts glass cover 20 extending across the entire surface of a housing 12 main portion, alternative embodiments may have a smaller footprint and may be used in peripheral keyboard configurations separate from an information handling system 10.

Figure 2A:
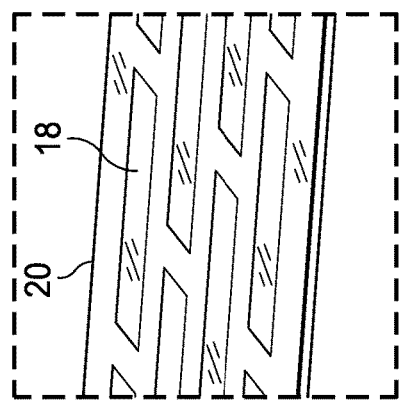
FIGS. 2 and 2A depict an exploded view of the keyboard configured to sense inputs through deflection of a glass cover.
Figure 2:
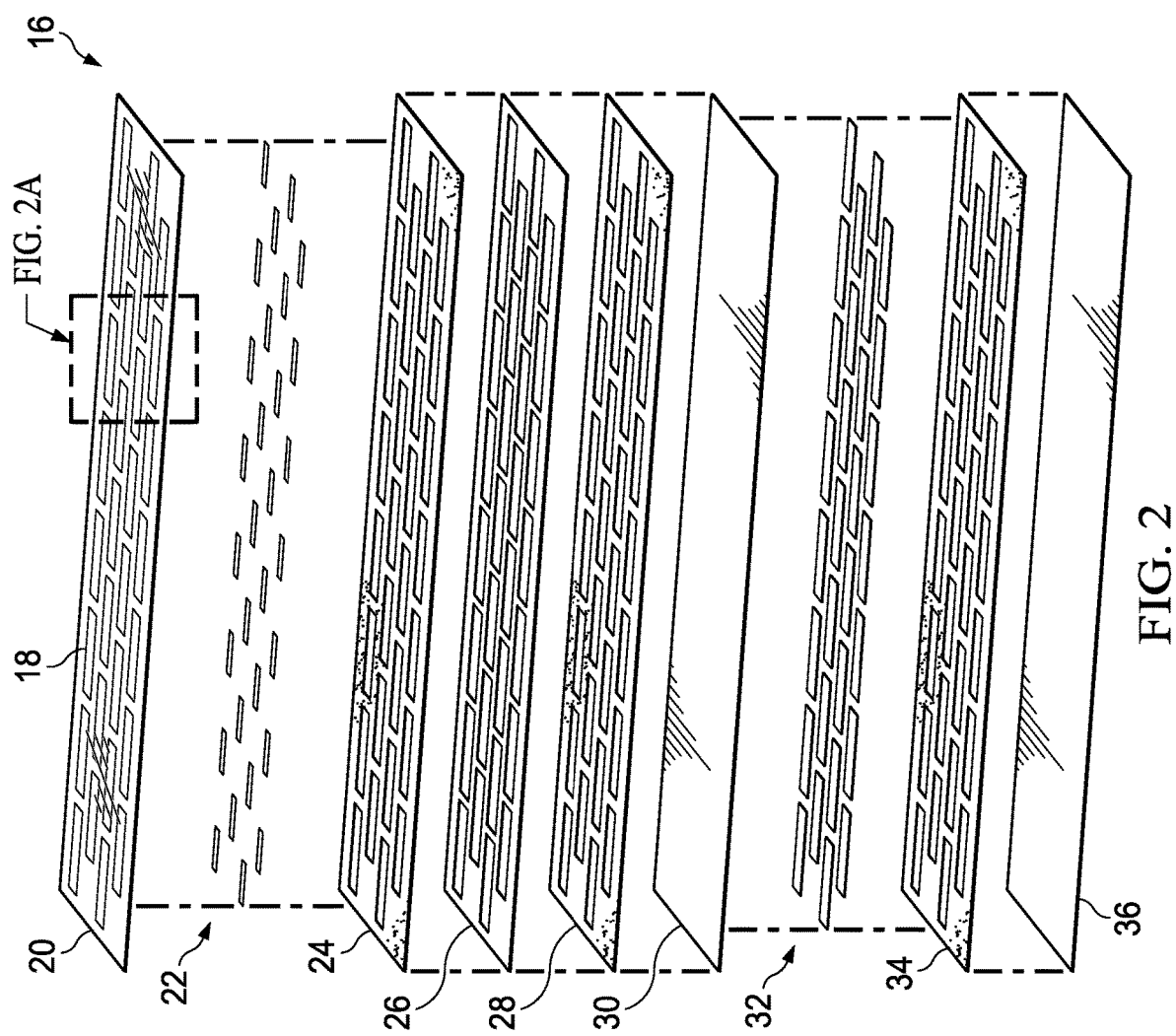

Referring now to FIGS. 2 and 2A, an exploded view depicts the keyboard 16 configured to sense inputs through deflection of a glass cover 20. FIG. 2A depicts that glass cover 20 has plural haptic keys 18 formed with a reduced thickness that provides deflection at the location of haptic key 18 relative to glass cover 20. Haptic keys 18 are depicted as rectangular shaped areas of thinned glass. For example, glass cover 20 has a thickness of 0.3 mm and haptic keys 18 have approximately 0.1 mm removed. Adhesive dots 22 coupled to glass cover 20 having a thickness of 0.2 mm couple to an underlying adhesive layer 24 having a thickness of 0.1 mm. Adhesive layer 24 couples glass cover 20 to a hyperelastic lattice 26 having openings formed to align with haptic key 18 positions. In the example embodiment, hyperelastic lattice 26 is a 0.2 mm thick hyperelastic material, such as a dense rubber, foam or silicon material having properties that dampen transmission of vibration. A second 0.1 mm thick layer of adhesive 28 couples hyperelatic lattice 26 to a membrane 30 having a thickness of 0.3 mm and incorporating sensors to detect presses plus organic light emitting (OLED) material that provides illumination. Membrane 30 is, for example, a conventional keyboard membrane having switch sensors located at each key position that close when pressed upon to provide an input indication. In the example embodiment, glass cover 20 at a haptic key position 18 deflects 0.6 mm in response to an end user press to contact membrane 30, thereby closing the switch sensor and signaling an input.

The openings formed at each key position by the adhesive 22, 24 and 28 and hyperelastic lattice 26 define the travel that a key press makes to press an input at membrane 30. The deflection of cover glass 20 in response to the key press provides the end user with feedback of the input and is reinforced when deflection presses against resistance of a support plate 36 coupled to the bottom side of membrane 30 with adhesive 34. Although this deflection provides an end user feedback regarding the input similar to key travel of conventional keyboard keys, the amount of deflection tends to be insufficient for a firm understanding that an input was made. To further reinforce feedback of an input, piezo actuators 32 are disposed between membrane 30 and support plate 36 and are actuated at each sensed key input. In the example embodiment, piezo actuators 32 have a thickness of 0.23 mm and are disposed in a keyboard key configuration within an adhesive layer having a thickness of 0.25 mm so that the key press meets resistance against the piezo actuator 32. Actuation of piezo actuator 32 generates vibration that passes through membrane 30 and against glass cover 20 at the haptic key 18 position that was pressed, however, the vibration is dampened from other key positions by hyperelastic lattice 26.

In the example embodiment, membrane 30 includes OLED material that provides illumination, such as in response to power communicated from a keyboard controller through membrane 30. OLED material may provide illumination that highlights key values etched or painted on cover glass 20 or may illuminate at the key values that show through cover glass 20. The example embodiment has a layer of piezo actuators 32 separate from membrane 30 and below each key position. Alternative embodiments may use other types of haptic actuators to generate haptic feedback, such as off center rotating weights, however piezo actuators provide a minimal thickness that helps to minimize the keyboard Z-height. In alternative embodiments, haptic devices, such as piezo actuators, may be incorporated in membrane 30 rather than as a separate layer below membrane 30 as is depicted. Alternatively, each piezo actuator 32 may include a key press sensor that detects a press so that a membrane 30 is not needed. An advantage of including the piezo actuator with the key press sensor is that actuation of the piezo actuator may be initiated directly by the key press sensor, such as by closing of the key press sensor switch to provide power to the piezo actuator. Separate disposition of the key press sensor and the piezo actuator generally has power to the piezo actuator managed by a keyboard controller in response to a sensed key press.

Figure 3A:
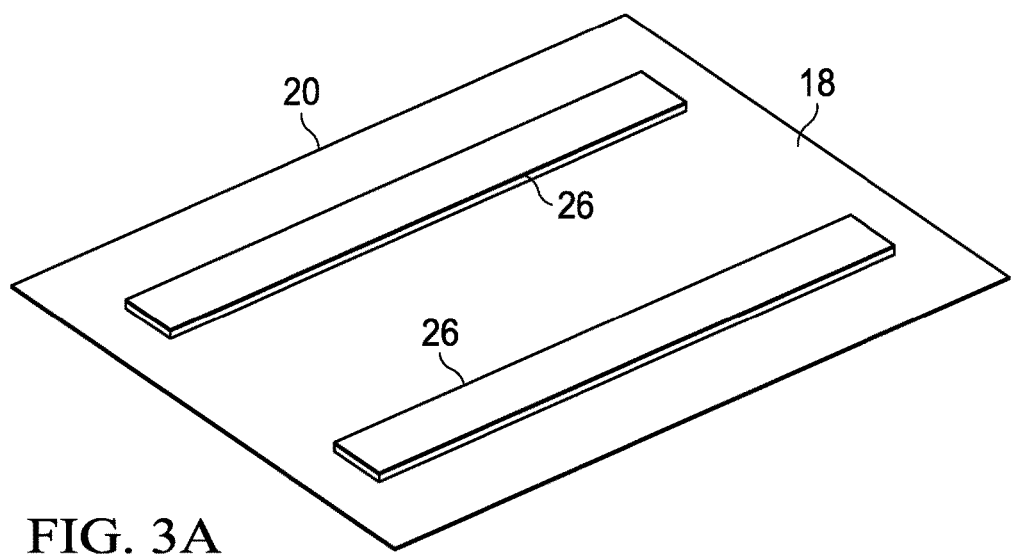
FIGS. 3A, 3B and 3C depict an example of deflection of a glass cover at a key position in response to a key press.
Figure 3B:
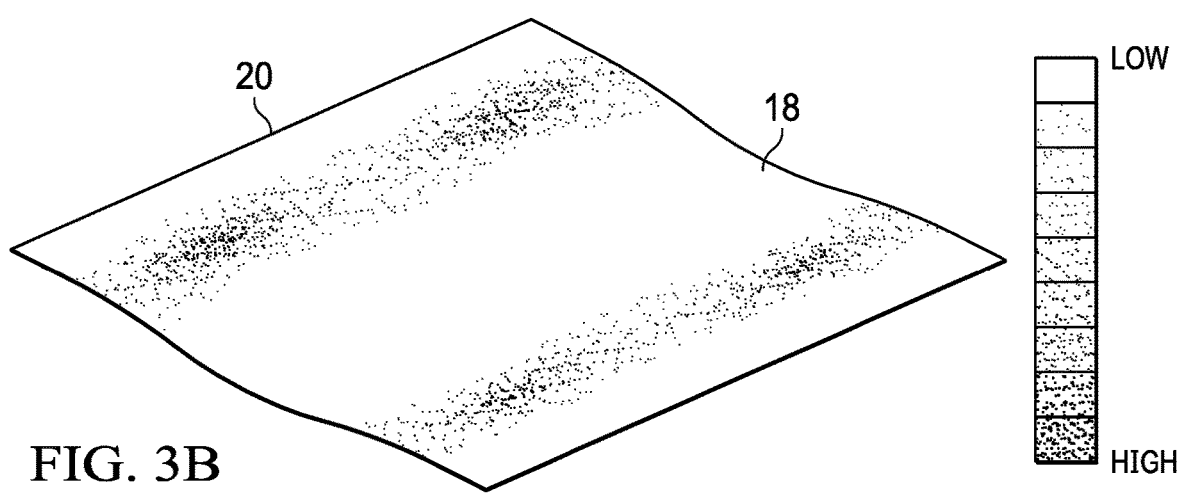
Figure 3C:
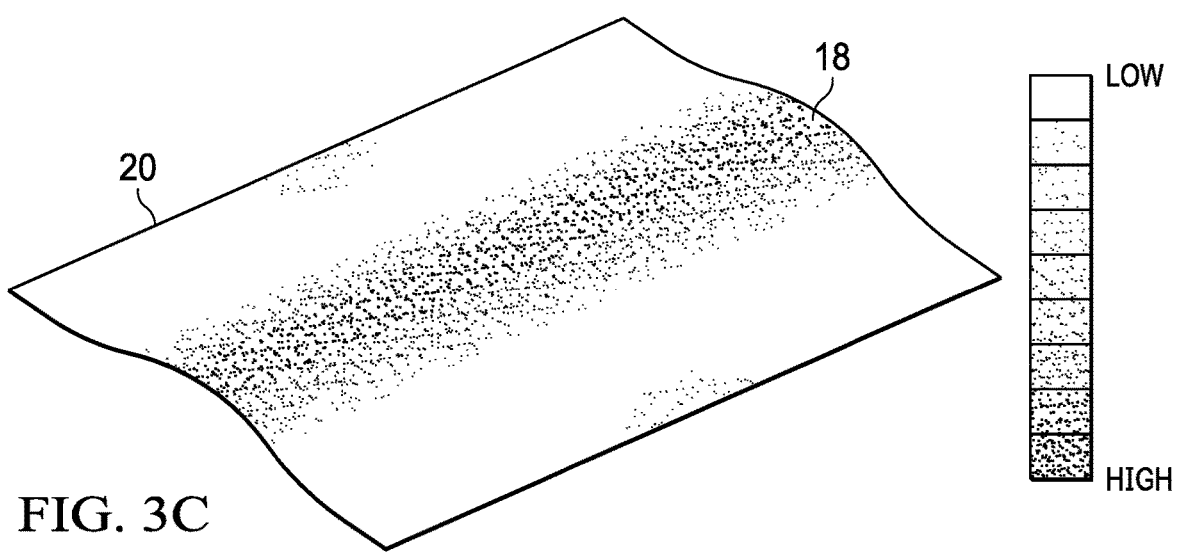

Referring now to FIGS. 3A, 3B and 3C, an example depicts deflection of a glass cover 20 at a haptic key 18 position in response to a key press. FIG. 3A depicts a bottom view of cover glass 20 with hyperelastic lattice 26 defining the haptic key 18 position at which deflection occurs. FIG. 3B depicts an top view of cover glass 20 in a neutral position where the hyperelastic lattice helps to bias the cover glass to the neutral position from below, which introduces a minimal stress where cover glass 20 rests on the hyperelastic lattice. FIG. 3 illustrates a press at a haptic key 18 position that causes deflection of cover glass 20 with the indicated material stress within the opening defined by the hyperelastic lattice. An advantage of providing feedback of an input with a piezo actuator is that the piezo actuator has a rapid response time to provide a low latency input feedback indication to an end user.

Figure 4:
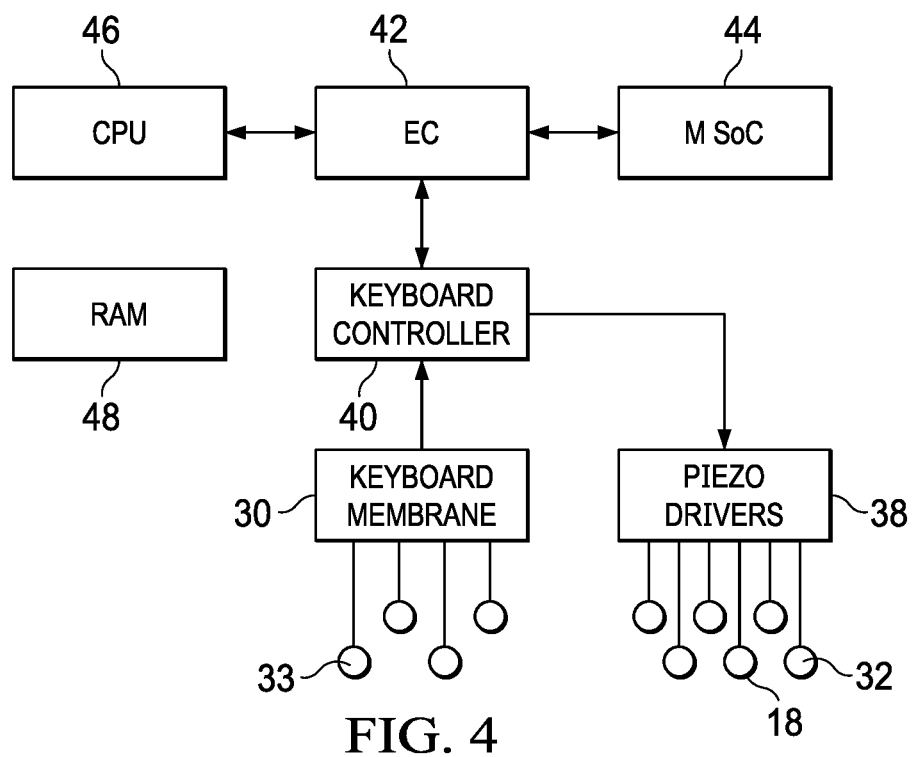
FIG. 4 depicts a block diagram of a system for coordinating haptic feedback in response to an input sensed by a glass cover deflection input.

Referring now to FIG. 4, a block diagram depicts a system for coordinating haptic feedback in response to an input sensed by a glass cover deflection input. A press at key press sensors 33 of membrane 30 reports a sensed input to a keyboard controller 40, such as through a conventional keyboard membrane matrix. In response to the sensed input, keyboard controller 40 communications a command to piezo drivers 38 to command actuation of a piezo actuator 32 at the haptic key 18 position associated with the key press sensor 33 that sensed the key input. As is described above, co-location of key press sensor 33 and piezo actuator 32 provides a haptic response without a controller command by feeding current from the closed key press sensor switch to the piezo actuator. Co-location may be accomplished by incorporating piezo actuators 32 into keyboard membrane 30 or by incorporating a key press sensor 33 into each piezo actuator. Keyboard controller 40 provides the sensed input to an embedded controller 42, which can communicate the key input directly to a central processing unit 46 or through an M SoC 44 that writes the input value to random access memory (RAM) 48 for use by CPU 46. CPU 46 coordinates with RAM 48 to execute instructions that process information, such as by executing an operating system that applies the keyed inputs to applications.

Figure 5:
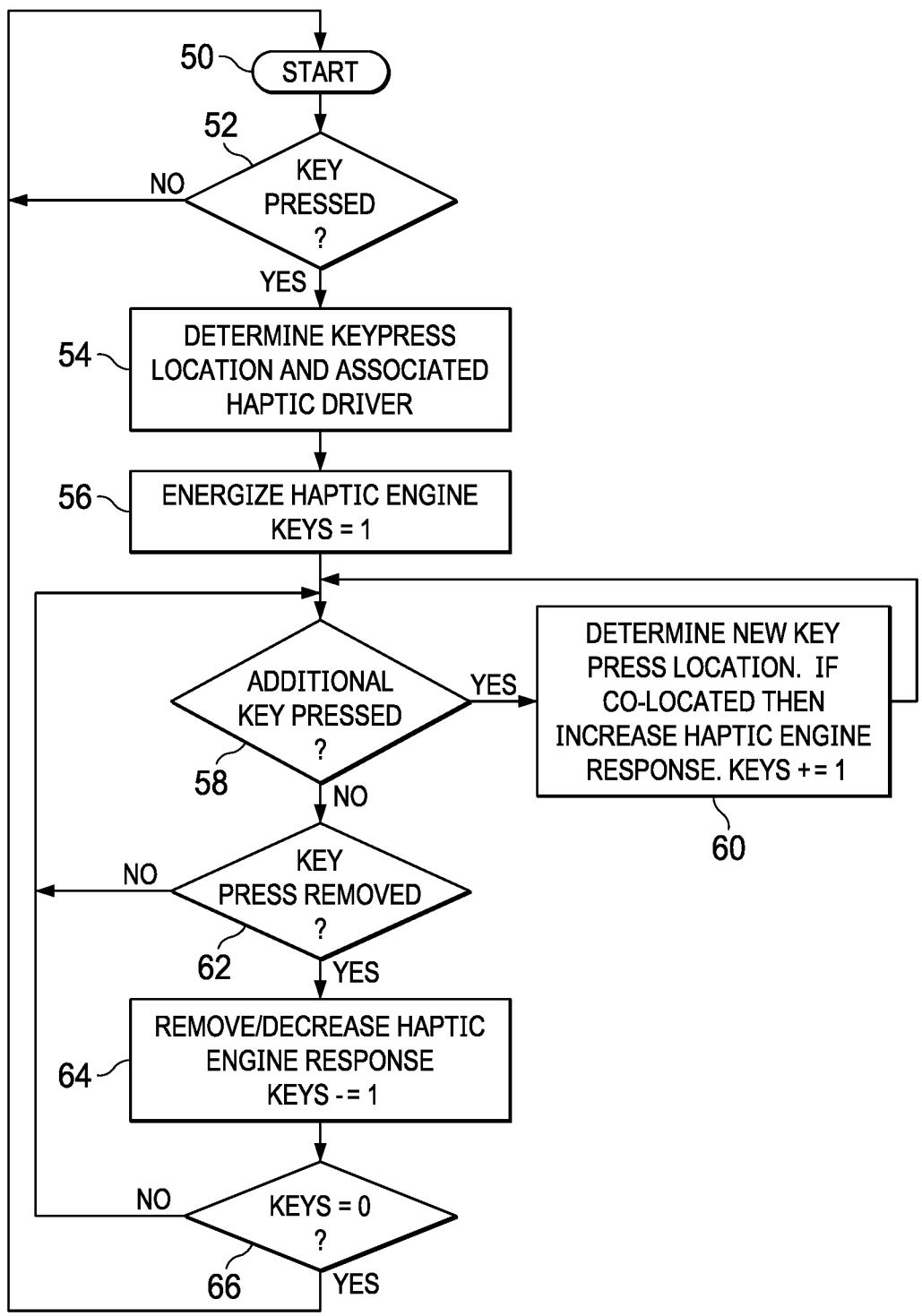
FIG. 5 depicts a flow diagram of a process for providing haptic feedback in response to a key input sensed by a glass cover deflection input.

Referring now to FIG. 5, a flow diagram depicts a process for providing haptic feedback in response to a key input sensed by a glass cover deflection input. The process starts at step 50 and continues to step 52 in a loop to detect if a key press is sensed by a key press sensor of the keyboard membrane. Once a key press is sensed, the process continues to step 54 to determine the keypress location and associated haptic driver of that keypress location. At step 56, the associated haptic device is actuated by the haptic driver, such as by applying current to a piezo actuator with a high signal from the keyboard controller to the piezo driver. At step 58, a loop is entered to detect additional key presses and, if an additional key press is detected, at step 60 to determine the new key position and actuate the haptic device associated with the key position. In one embodiment, co-located key inputs may coordinate the haptic response by increasing the actuation of the piezo actuator, such as with a greater current to command an increased haptic output. At step 62 a loop is entered to detect when the key press is removed. At removal of the keypress, the process continues to step 64 to remove or decrease the haptic response associated with the key press. If at step 66 a keypress remains, the process returns to step 58 to continue monitoring the keypress for either and additional input or removal of the keypress. Once removal of the keypress is detected at step 66 the process returns to step 50 to continue monitoring for key press inputs.

Although the present invention has been described in detail, it should be understood that various changes, substitutions and alterations can be made hereto without departing from the spirit and scope of the invention as defined by the appended claims.

What is claimed is:
1. An information handling system comprising:
   a housing;
   a processor disposed in the housing and operable to execute instructions that process information;
   a memory disposed in the housing and interfaced with the processor to store the instructions and information;

a display coupled to the housing and interfaced with the processor to present the information as visual images;

a keyboard coupled to the housing and interfaced with the processor, the keyboard having plural sensors, each sensor operable to detect an end user press and report the press to the processor as an input, the plural sensors covered by a contiguous solid material of a first thickness and having a second thickness over each of the plural sensors, the second thickness less than the first thickness and configured to deflect in response to a press from a first position distal the sensor to a second position in contact with the sensor;

plural piezo actuators disposed under the contiguous solid material, each of the plural piezo actuators aligned under the second thickness; and a controller interfaced with the plural sensors and the plural piezo actuators, the controller activating each of the plural piezo actuators when the sensor associated with the piezo actuator senses a press.

2. The information handling system of claim 1 further comprising:
a support plate disposed under the plural sensors; and
a membrane disposed between the contiguous solid material and the support plate, the membrane incorporating the plural sensors.

3. The information handling system of claim 2 wherein:
the contiguous solid material comprises a transparent material; and
the membrane comprises organic light emitting diode (OLED) material configured to illuminate at each of the plural sensors.

4. The information handling system of claim 3 wherein the transparent material comprises a glass ceramic.

5. The information handling system of claim 3 wherein the OLED material at each of the plural sensors illuminates as a key value associated with an input at each of the plural sensors.

6. The information handling system of claim 3 further comprising a hyperelastic lattice disposed between the membrane and the contiguous solid material, the hyperelastic lattice having plural opening, each opening aligned with one of the plural sensors.

7. The information handling system of claim 1 further comprising:
a piezo actuator integrated with each of the plural sensors;
wherein each of the plural sensors activates the integrated piezo actuator at detection of a press by the sensor.

8. The information handling system of claim 7 wherein the contiguous solid material comprise a ceramic glass.

9. A method for accepting key inputs at an information handling system keyboard having plural keys, the method comprising:
configuring plural sensors so that each of the plural sensors aligns with a keyboard key position;
covering the plural sensors with a glass cover formed of a glass ceramic sheet that extends over all of the keyboard key positions, the glass cover having a first thickness and plural areas of a second thickness of less than the first thickness, the plural areas of second thickness configured to align with the plural sensors; and deflecting the glass cover in response to a press at the second thickness, the sensor sensing an input at the glass cover contacting the sensor due to the deflecting.

10. The method of claim 9 further comprising:
configuring plural piezo actuators to have each of the plural piezo actuators align with each of the keyboard key positions; and
in response to sensing the input at a keyboard key position due to the deflecting, actuating the piezo actuator of the keyboard key position.

11. The method of claim 10 further comprising:
communicating sensed inputs to a controller; and
actuating the piezo actuator in response to the sensing with the controller.

12. The method of claim 10 further comprising:
interfacing each of the plural sensors with one or more of the piezo actuators; and
actuating the one or more piezo actuators directly with the sensor when the sensor senses an input.

13. The method of claim 10 further comprising:
incorporating the plural sensors in a membrane; and
incorporating OLED material in the membrane to illuminate at each of the keyboard key positions.

14. The method of claim 10 further comprising:
disposing a hyperelastic lattice between the glass cover and the plural sensors, the hyperelastic lattice having an opening aligned with each keyboard key position to provide space for deflection of the glass cover against the sensor.

15. The method of claim 14 wherein the glass cover has a first thickness and have plural areas of a second thickness, each of the plural areas of the second thickness aligned over each of the plural sensors, the second thickness less than the first thickness.

16. A keyboard comprising:
a support plate;
plural sensors configured over the support plate as plural keys of a keyboard; and
a glass cover coupled over the support plate and plural sensors, the glass cover having a first thickness and plural areas of a second thickness of less than the first thickness, the plural areas of second thickness configured to align with the plural sensors, each area of second thickness deflecting in response to a press, the deflecting contacting each of the plural sensors.

17. The keyboard of claim 16 further comprising:
plural haptic devices configured over the support plate as the plural keys, each haptic device associated with one or more of the plural sensors; and
a hyperelastic lattice disposed over the support plate and having an opening aligned with each of the plural sensors.

18. The keyboard of claim 17 further comprising:
a membrane incorporating the plural sensors and plural haptic devices;
wherein each of the plural sensors interfaces with an associated of the plural haptic devices to actuate the associated haptic device when an input is sensed.

19. The keyboard of claim 17 further comprising:
a membrane incorporating the plural sensors and OLED material to illuminate a key value at each key.

* * * * *